(12) United States Patent
Schmid

(10) Patent No.: US 11,826,944 B2
(45) Date of Patent: Nov. 28, 2023

(54) DIRECTIONAL CONTROL VALVE AND A SEALING ARRANGEMENT THEREFORE

(71) Applicant: Norgren AG, Sirnach (CH)

(72) Inventor: Daniel Schmid, Balterswil/TG (CH)

(73) Assignee: Norgren AG, Sirnach (CH)

( * ) Notice: Subject to any disclaimer, the term of this patent is extended or adjusted under 35 U.S.C. 154(b) by 0 days.

(21) Appl. No.: 17/608,550

(22) PCT Filed: Apr. 28, 2020

(86) PCT No.: PCT/EP2020/061774
§ 371 (c)(1),
(2) Date: Nov. 3, 2021

(87) PCT Pub. No.: WO2020/225032
PCT Pub. Date: Nov. 12, 2020

(65) Prior Publication Data
US 2022/0227035 A1   Jul. 21, 2022

(30) Foreign Application Priority Data
May 3, 2019   (EP) .................................... 19172668

(51) Int. Cl.
*F16K 11/07*   (2006.01)
*B29C 49/42*   (2006.01)
(Continued)

(52) U.S. Cl.
CPC ...... *B29C 49/4289* (2013.01); *F16K 11/0712* (2013.01); *F16K 31/383* (2013.01); *B29L 2031/7158* (2013.01)

(58) Field of Classification Search
CPC . B29C 49/4289; F16K 11/0712; F16K 31/383
See application file for complete search history.

(56) References Cited

U.S. PATENT DOCUMENTS 4,574,844 A   3/1986   Neff et al.
5,535,783 A   7/1996   Asou et al.
(Continued)

FOREIGN PATENT DOCUMENTS

JP   S56 55762 A   5/1981

OTHER PUBLICATIONS

Extended European Search Report prepared by the European Patent Office in application No. EP 19172668.6 dated Oct. 19, 2018.
(Continued)

*Primary Examiner* — Kevin R Barss
(74) *Attorney, Agent, or Firm* — McDonnell Boehnen Hulbert & Berghoff LLP

(57) ABSTRACT

A valve (10) comprising a bore (14) extending about an actuation axis (A), wherein a spool (34) inside the bore (14) is actuated between a first working position and a second working position, and a first circumferential seal wing (56A) and a second circumferential seal wing (56B) being arranged on the spool (34). In the first working position, the first seal wing (56A) abuts to an outer first recess wall (24*a*) and the second seal wing (56B) abuts to an inner second recess wall (24*c*), so as to open some flow paths and close other flow paths. In the second working position, the first seal wing (56A) abuts to an inner first recess wall (24*b*) and the second seal wing (56B) abuts to an outer second recess wall (24*d*), so as to close some flow paths and open other flow paths.

15 Claims, 12 Drawing Sheets

Figure 1:
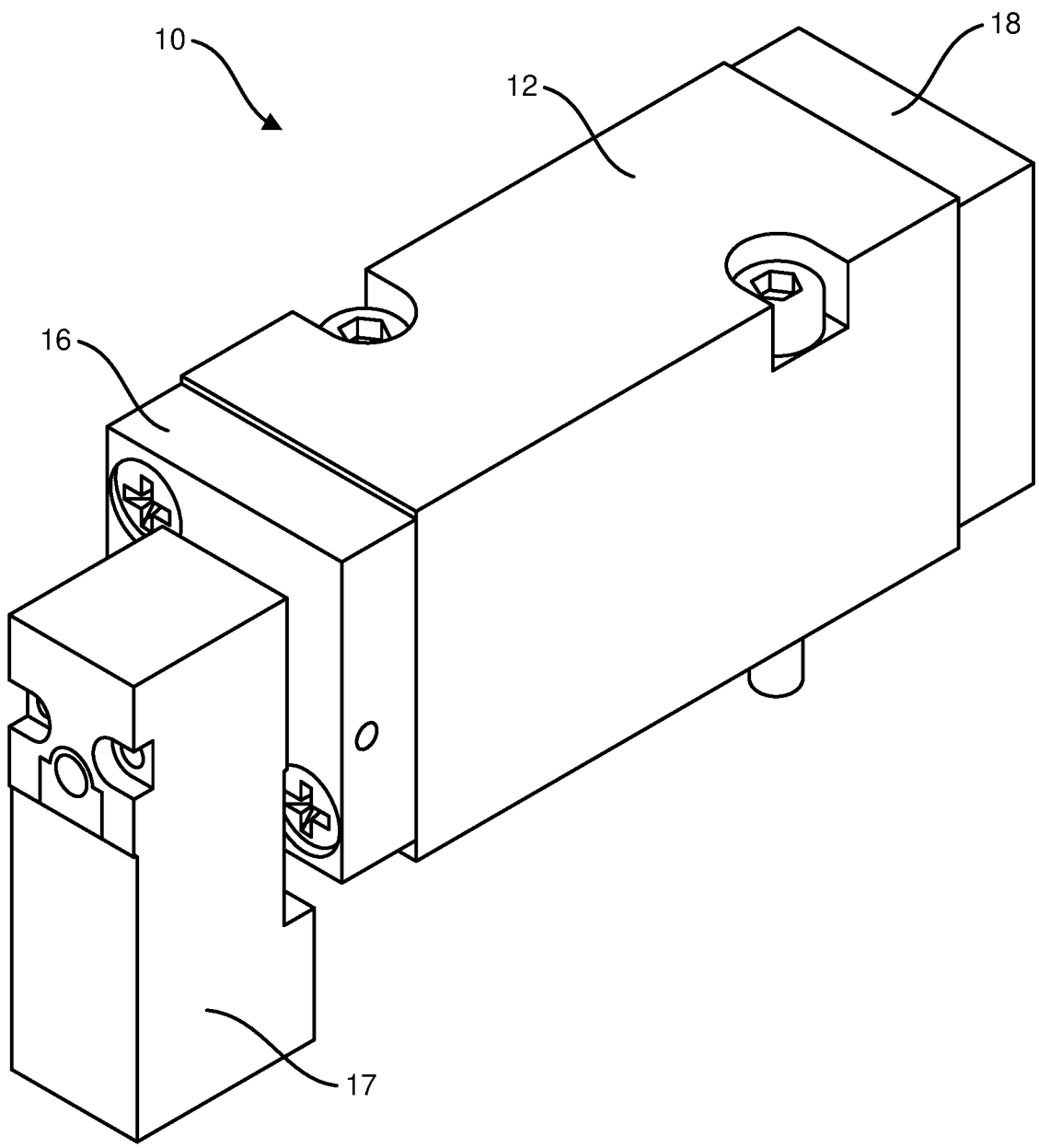

(51) Int. Cl.
*F16K 31/00* (2006.01)
*F16K 31/383* (2006.01)
*B29L 31/00* (2006.01)

(56) References Cited

U.S. PATENT DOCUMENTS

2003/0047222 A1  3/2003  Neff et al.
2010/0252132 A1  10/2010 Neff et al.
2012/0001370 A1  1/2012  Zacche

OTHER PUBLICATIONS

International Search Report prepared by the European Patent Office in international application No. PCT/ EP2020/061774 dated May 26, 2020.

DIRECTIONAL CONTROL VALVE AND A SEALING ARRANGEMENT THEREFORE

This invention relates to directional control valves and sealing arrangements for spool valves.

Directional control valves, such as spool valves, are used in hydraulic and pneumatic machinery to restrict, permit, or change direction of flow from a pressurised source. Typically, spool valves are classified in accordance with the number of ports, number of spool positions, actuation methods, and type of spool.

In a known configuration, a spool valve comprises a housing with a bore and a sliding spool disposed within the bore. The bore may include a plurality of grooves for receiving o-rings. The o-rings are seated in the grooves and are slideably engaging the bore, thus defining and separating adjacent fluid chambers. Appropriate sealing is crucial from the perspective of correct operation of the spool valve, as adjacent fluid chambers may sometimes be at significantly different pressures.

Using o-rings in a spool valve has various disadvantages. In applications such as stretch blow moulding, actuation speed, thus opening and closing time, must be carefully controlled. Upon actuating the valve, o-rings interact with the bore of the housing to create a frictional force opposing the actuation force. Therefore, achieving a specific actuation speed and time may not be always possible, as it is dependent upon the extent of this frictional interaction.

Secondly, installation and maintenance of such seals is challenging. The diameter of a typical groove for receiving seals is larger than the diameter of the seal. Dedicated tooling is required to place the seal within its groove. Installation of the seal involves stretching the seal using dedicated tooling, arranging the seal around its respective groove, and removing the tool to allow the seal to drop into the groove. The installation process may scratch or even break the seal. Removing spent or damaged seals is also done using dedicated tools, such as a pick tool. The sharp end of the pick tool is used to pry off the seal from its respective groove. Rubber o-rings removed in this fashion cannot be re-used, as they usually get irreversibly damaged in the process. Moreover, frequent seal changes can lead to scratching of the surface of the spool, which may reduce the efficiency of operation of the valve.

The object of the present invention is to provide an improved valve, which addresses at least one of the above-mentioned problems.

Thus, according to a first aspect of the invention there is provided a valve comprising a bore extending about an actuation axis, an inlet port, a first outlet port, a first exhaust port, a second outlet port, and a second exhaust port, wherein a spool inside the bore is actuated between a first working position and a second working position, and a first circumferential seal wing and a second circumferential seal wing being arranged on the spool,
  wherein a diameter of the spool is smaller than a diameter of the bore thus establishing a first fluid path between the inlet port and the first outlet port, establishing a second fluid path between the first outlet port and the first exhaust port, establishing a third flow path between the inlet port and the second outlet port, and establishing a fourth flow path between the second outlet port and the second exhaust port;
  a first annular recess radially extending from the bore and being in permanent fluid communication with the first outlet port, the first annular recess comprising an outer first recess wall next to the first exhaust port and an inner first recess wall next to the inlet port;
  a second annular recess radially extending from the bore and being in permanent fluid communication with the second outlet port, the second annular recess comprising an outer second recess wall next to the second exhaust port and an inner second recess wall next to the inlet port,
  whereby the first seal wing and the second seal wing are arranged on the spool, such that:
    in the first working position, the first seal wing abuts to the outer first recess wall, thus closing the second fluid path and opening the first fluid path, and the second seal wing abuts to the inner second recess wall, thus closing the fourth flow path and opening the third flow path;
    in the second working position, the first seal wing abuts to the inner first recess wall, thus closing the first flow path and opening the second fluid path, and the second seal wing abuts to the outer second recess wall, thus closing the third flow path and opening the third flow path.

Advantageously, arranging seals in this way minimises frictional interaction between the seals and the bore. This accounts for much faster switching times of the valve. The switching times can also be accurately controlled, as there are almost no frictional losses in this system. Whilst achieving all of the above, the seals are able to separate chambers under vastly different pressures. This arrangement improves durability of the valve, as the seals wear out slower. It also has a positive effect on running costs and downtime. Lastly, the seals can abut the housing, instead of rubbing against it, which further improves their durability.

Optionally, the valve includes a housing, a first cap, and a second cap, the housing having the bore, and having a first housing end and a second housing end, wherein the first cap is disposed at the first end of the housing, and the second cap disposed at the second end of the housing, the valve further comprising a biasing element for returning the valve from the second working position to the first working position and disposed around the spool and between the spool and the second cap.

Optionally, the first seal wing is flexible, such that, in the first working position of the valve, it is adapted to abut the first outer recess wall so as to elastically deflect, and wherein the second seal wing is flexible, such that, in the second working position of the valve, it is adapted to abut the second outer recess wall so as to elastically deflect.

Advantageously, elastic deflection of each seal wing eliminates the need for frictional interaction between the bore and each seal wing. Instead, sealing between neighbouring fluid chambers is possible due to a wing pressing against the respective wall of the respective recess. This provides the necessary sealing between two pressurised Optionally, the valve comprises a tubular connector disposed around the spool and extending axially between the first and second seal wing, wherein the first seal wing, the second seal wing, and the tubular connector together form a unitary seal.

Advantageously, two wings and a tubular connector form a unitary seal. The unitary seal is a single component, making it easy to manufacture. Its shape facilitates quick and simple assembly on the spool. Cost of production and time to assemble are both substantially reduced.

Optionally, the valve further comprises a first dynamic seal and a second dynamic seal, said first and second dynamic seal being circumferentially disposed around each end of the spool, the dynamic seals being configured to centre the spool such that the spool does not directly contact the bore of the housing.

Advantageously, dynamic seals are the only component which is in continuous contact with both the spool and the bore. Owing to that, the spool is moveable within the bore with a minimal amount of friction. Friction in the system is only due to the dynamic seals moving along the surface of the bore.

Optionally, the second pressure cap comprises a secondary bore for receiving the spool, wherein the secondary bore is permanently fluidly connected to the second annular recess, such that the secondary bore is configured to act as an air spring for transmitting the spool from the second working position to the first working position, wherein the first dynamic seal is arranged between the bore and the spool and the second dynamic seal is arranged between the spool and the secondary bore.

Advantageously, the air spring uses the pressure of the main pressure supply to create a cushion of pressurised air which helps to move the spool from a working to a resting position. The air spring helps achieve faster switching times, thus directly increasing throughput of a blow moulding machine, for instance.

Optionally, the valve further comprises a first chamfered edge disposed at an intersection between the bore and the inner first recess wall, and comprising a second chamfered edge disposed at an intersection between the bore and the inner second recess wall.

Optionally, the spool includes a first radially extending protrusion for accommodating the first seal wing, and wherein the spool includes a second radially extending protrusion for accommodating the second seal wing.

Advantageously, wings of the seal are supported by respective protrusions, thereby preventing plastic deformation of the wings when engaging one of the recesses.

Optionally, the first seal wing has a diameter which is smaller than a diameter of the first recess, and wherein the second seal wing has a diameter which is smaller than a diameter of the second recess.

Advantageously, each seal wing interacts only with radial walls of its respective recess and does not touch circumferential walls of its respective recess. This reduces losses due to friction and increases a lifetime of each seal wing.

Optionally, in the second working position, the first sealing wing is sheared between the first chamfered edge of the first recess and the first protrusion so as to establish a fluid tight contact patch therebetween, while the second seal wing bears against the outer second recess wall, so as to deflect from the second protrusion, forming a gap therebetween, and wherein, in the first working position, the second sealing wing is sheared between the second chamfered edge of the second recess and the second protrusion so as to establish a fluid tight contact patch therebetween, while the first seal wing bears against the outer first recess wall, so as to deflect from the first protrusion, forming a gap therebetween.

Advantageously, each seal wing is clamped between a protrusion and a chamfered edge. Because these two components are at a substantially similar angle with respect to a horizontal plane, each wing can be sheared between the protrusion and the chamfered edge. This increases the contact patch between the seal wing and the protrusion, as well as the protrusion and the chamfered edge, to provide improved sealing between neighbouring zones under varying pressures.

Optionally, the valve further comprises an actuator operatively connected to the spool for moving the spool from the first working position to the second working position, where the actuator is: electromechanical, hydraulic, or pneumatic, wherein the actuator is disposed on or within the first cap.

Advantageously, the valve assembly is not limited to one actuation method, as it may be actuated using various available methods.

Optionally, the spool comprises of a first module and a second module, wherein the second module receives the first module thus forming an interference fit therebetween, and wherein the first module includes the first radially extending protrusion, and wherein the second module includes the second radially extending protrusion, and wherein the biasing element is clamped between the second protrusion and the second pressure cap.

Advantageously, the modular construction of the spool facilitates easy assembly of various elements of the valve, in particular the biasing spring and the unitary seal.

According to a second aspect of the present invention there is provided a blow moulding machine, comprising:
  a main valve comprising a housing and a piston moveable within the housing, the housing having at least one inlet port and at least one outlet port in fluid communication with the inlet port, the housing also comprising a first control port and a second control port, the first control port being in fluid communication with a first control chamber and the second fluid port being in fluid communication with the second control chamber,
  a valve as defined in of any of the preceding claims, wherein the first outlet port is in fluid communication with the first control port, and the second outlet port is in fluid communication with the second control port, such that when the valve is in the open position, the piston opens a flow path between the inlet port and the outlet port, and when the valve is in the closed position, the piston closes the flow path between the inlet port and the outlet port.

Optionally, the main valve is pressure balanced, or wherein the blow moulding valve is for manufacturing plastic containers, or plastic bottles.

Advantageously, using the above described valve in a blow moulding machine will significantly increase throughput of such a machine, with no effect on quality of produced bottles. Faster switching times, lower failure frequency and easy assembly have a positive effect on reliability, speed of operation and reparability.

According to a third aspect of the present invention there is provided a seal, comprising:
  a tubular section extending along an axis and having a first and a second end;
  a first wing section disposed at the first end of the tubular section, the first wing section extending radially away from the first end of the tubular section;
  a second wing section disposed at the second end of the tubular section, the second wing section extending radially away from the second end of the tubular section;
  wherein the first wing section and the second wing section extend axially along the axis away from one another, wherein the tubular section, the first wing section, and the second wing section together define a unitary seal for a spool valve.

Advantageously, a unitary seal is relatively simple to mass produce using known manufacturing techniques.

According to a fourth aspect of the present invention there is provided a method of assembling a valve of any preceding claim, comprising the steps of:

providing: a housing having a bore extending along an axis, and having a first end and a second end; a modular piston having a first module and a second module, wherein the first module is received in an opening of the second module, the first module having a first radial protrusion and the second module having a second protrusion; a unitary seal having a tubular section with a first and a second end; a biasing spring; a pressure cap;

providing a tubular insert for introducing the unitary seal into the bore of the housing, the tubular insert being smaller than the bore and having an inner surface for engaging with the unitary seal;

compressing radially the unitary seal and subsequently inserting the compressed unitary seal into the tubular insert;

inserting the first module of the piston into the housing;

inserting the tubular insert with the compressed unitary seal into the housing and mounting the tubular section of the unitary seal on the first module of the piston so that the unitary seal is in contact with the first radial protrusion;

assembling the second module onto the first module so that the seal is also in contact with the second radial protrusion;

attaching the first pressure cap to the first housing end;

disposing the biasing spring on the second radial protrusion;

attaching the pressure cap to the second housing end, such that the spring is clamped between the second protrusion and the second pressure cap.

Advantageously, the above method facilitates mounting a unitary seal on a spool with a relative ease. The method ensures that the seal remains intact after assembly. Moreover, the method does not require stretching of the seal or aligning of the seal with its respective groove. This results in shorter overall downtime, as seals do not have to be replaced frequently.

Figure 2:
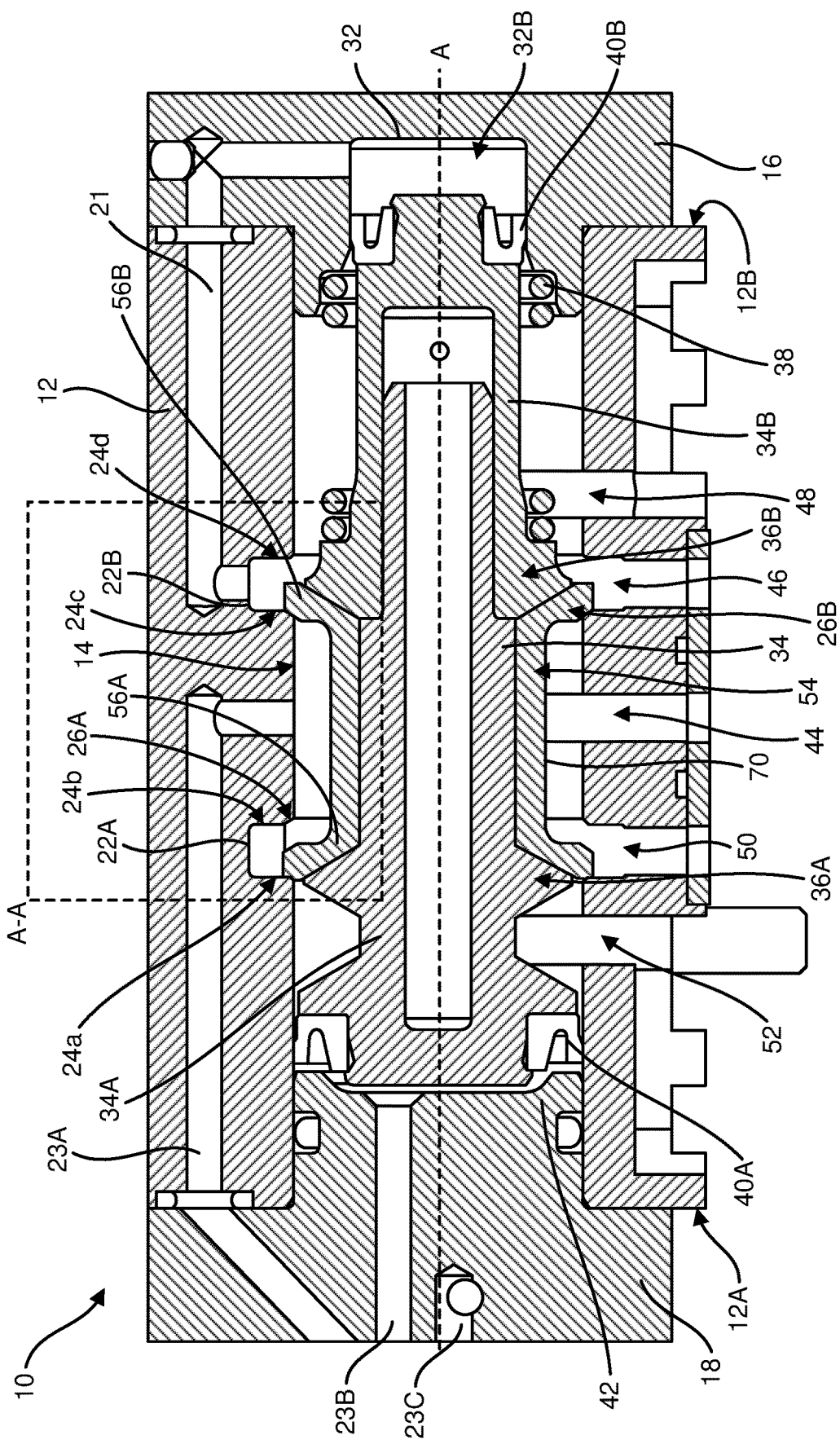
Figure 3:
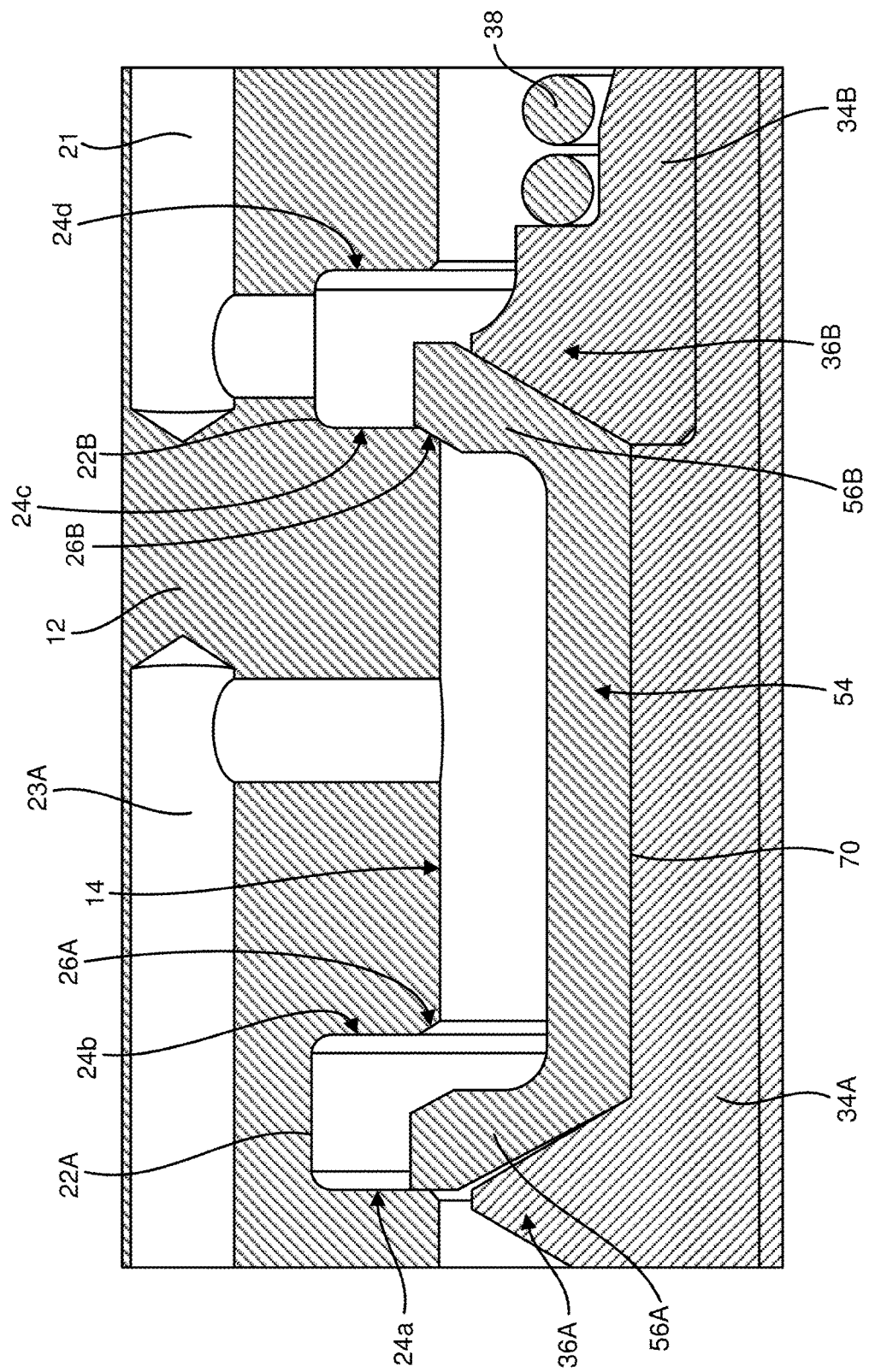
Figure 4:
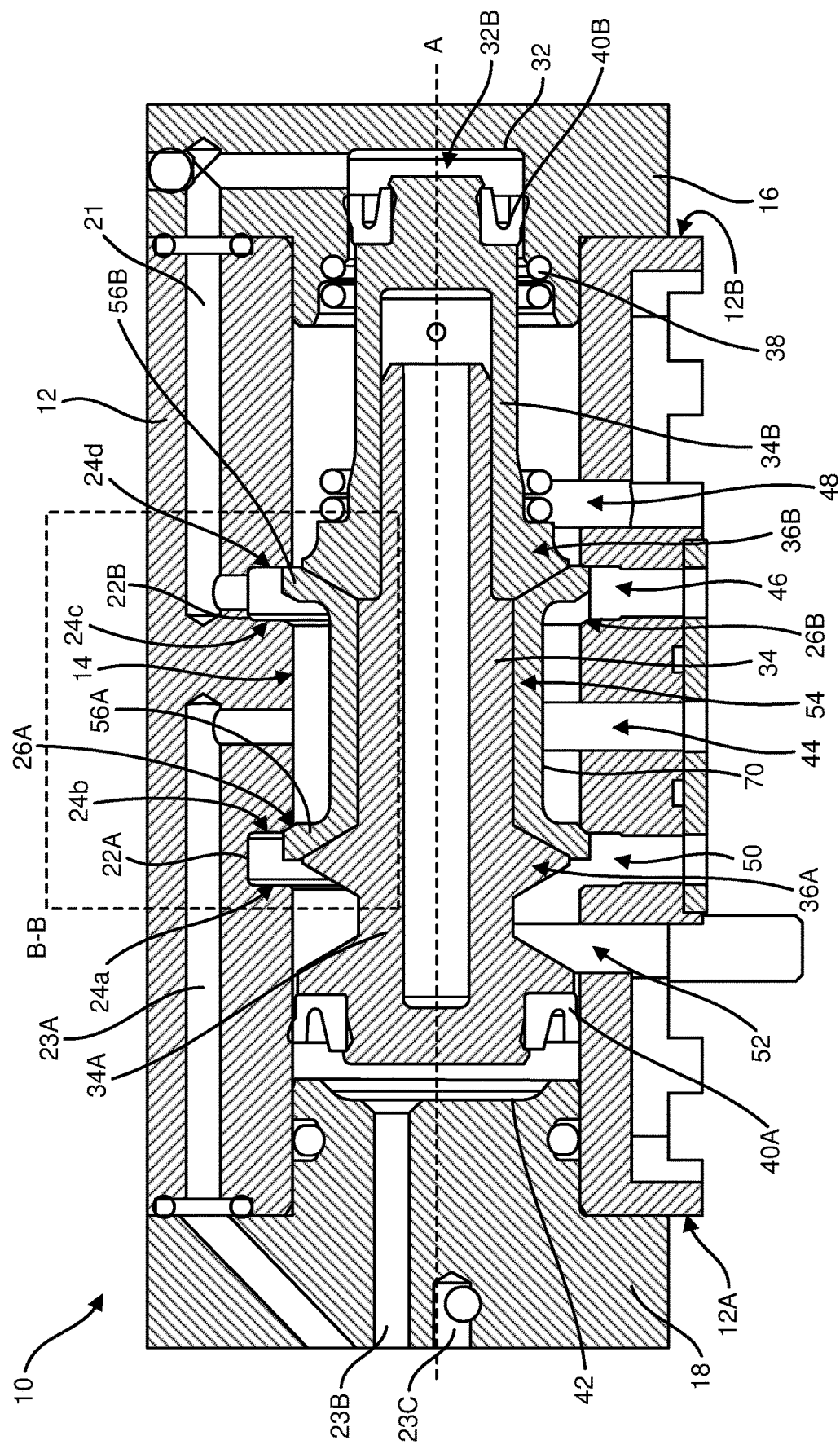
Figure 5:
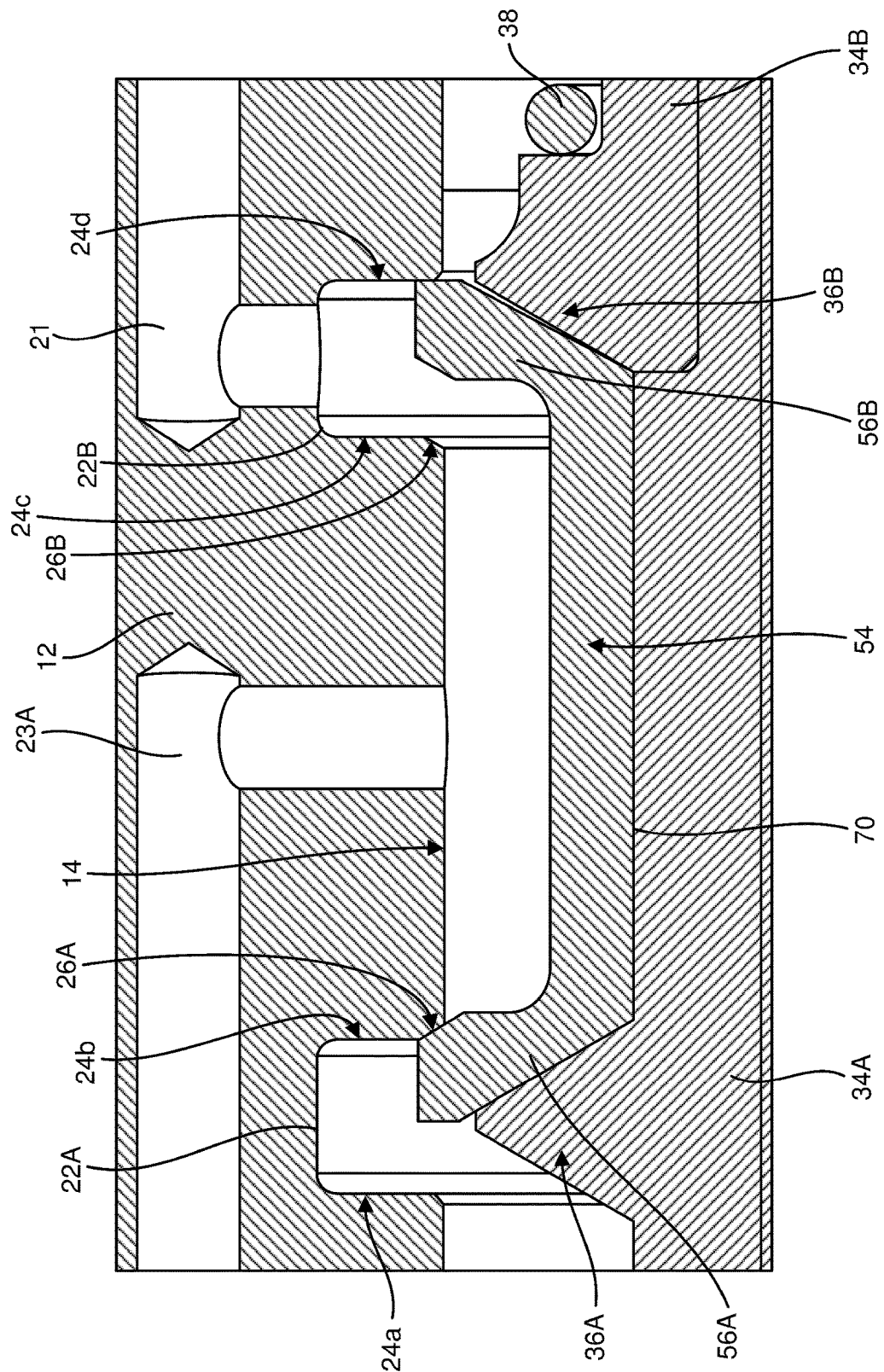
Figure 6:
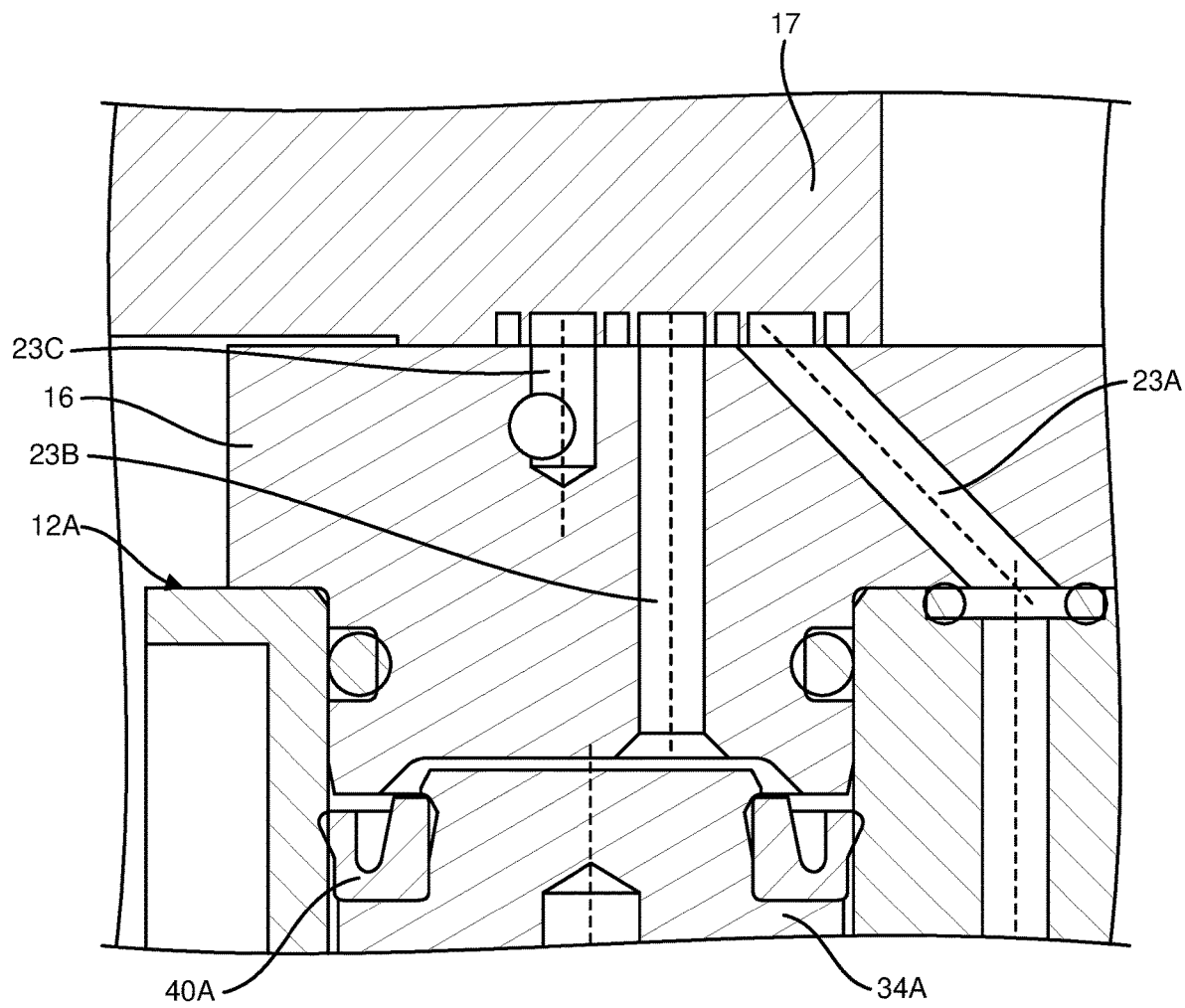
Figure 7:
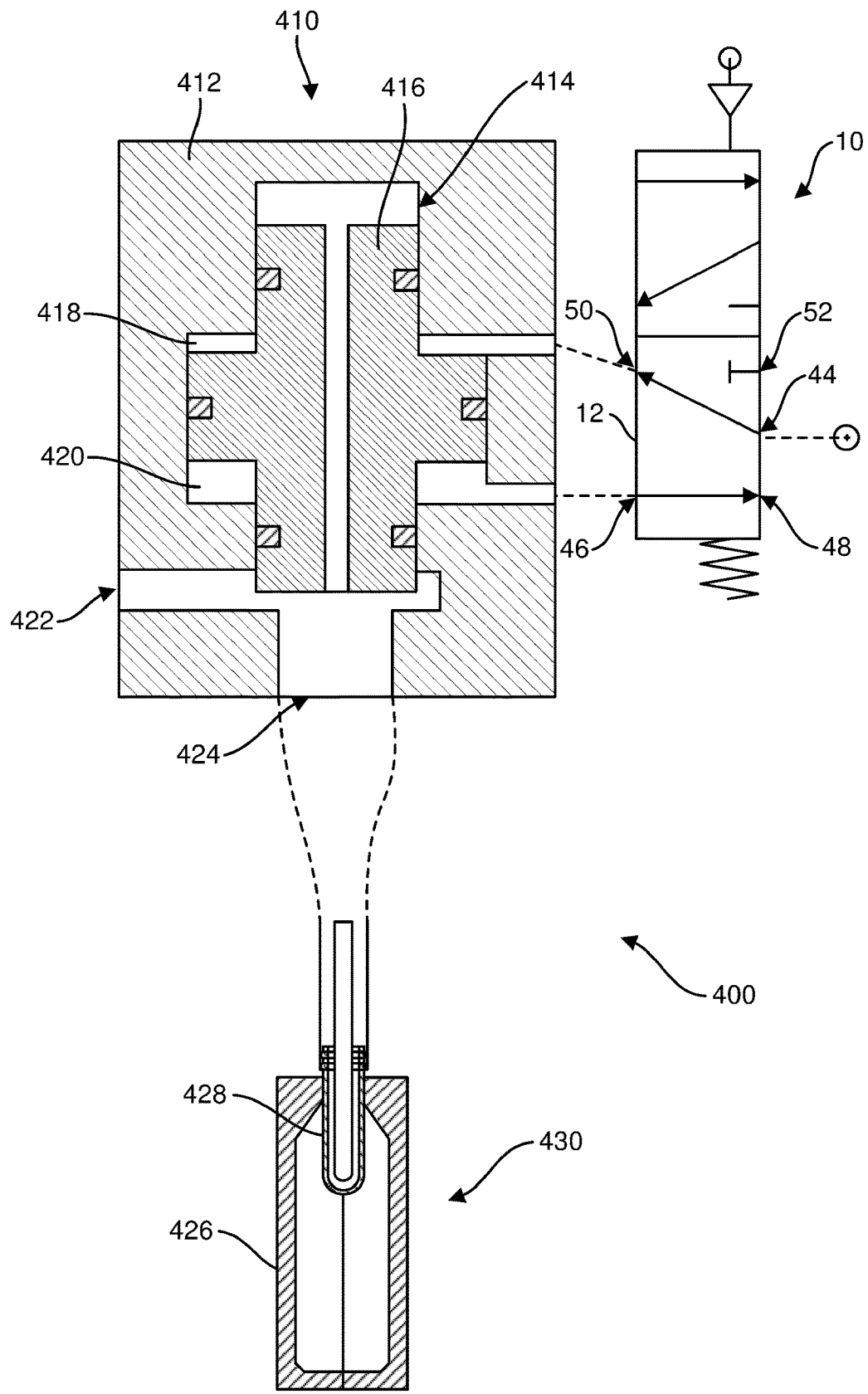
Figure 8:
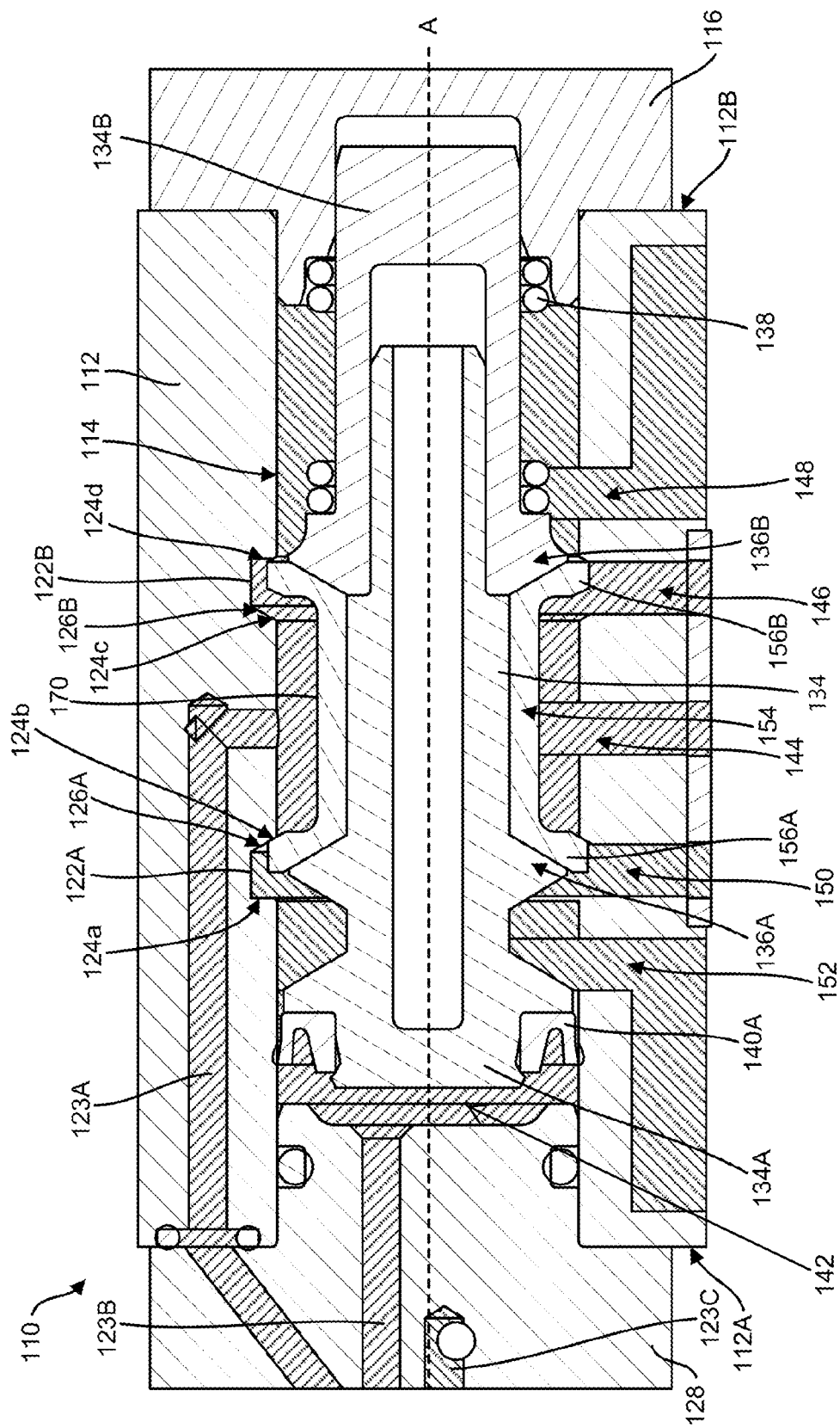
Figure 9:
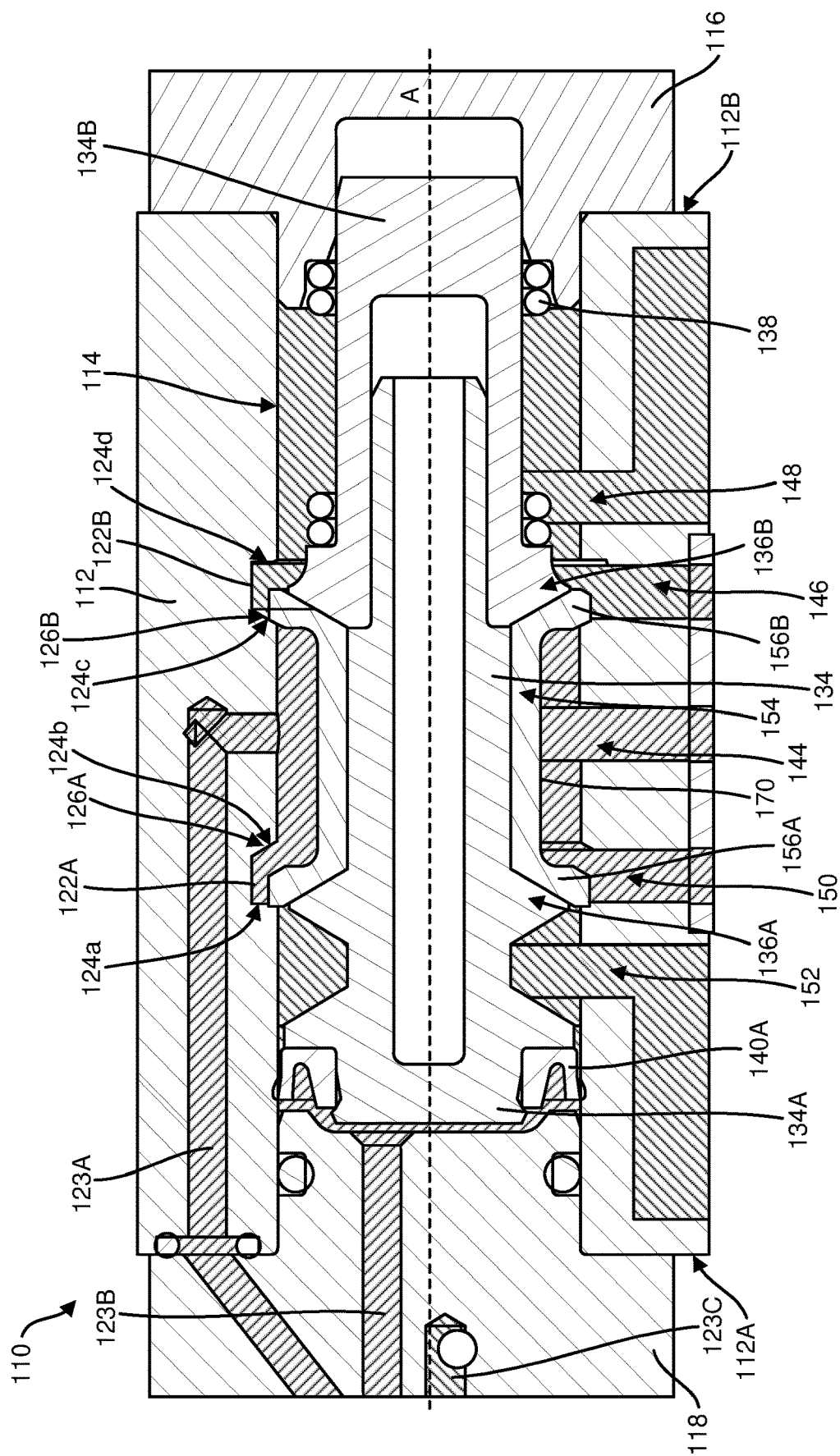
Figure 10:
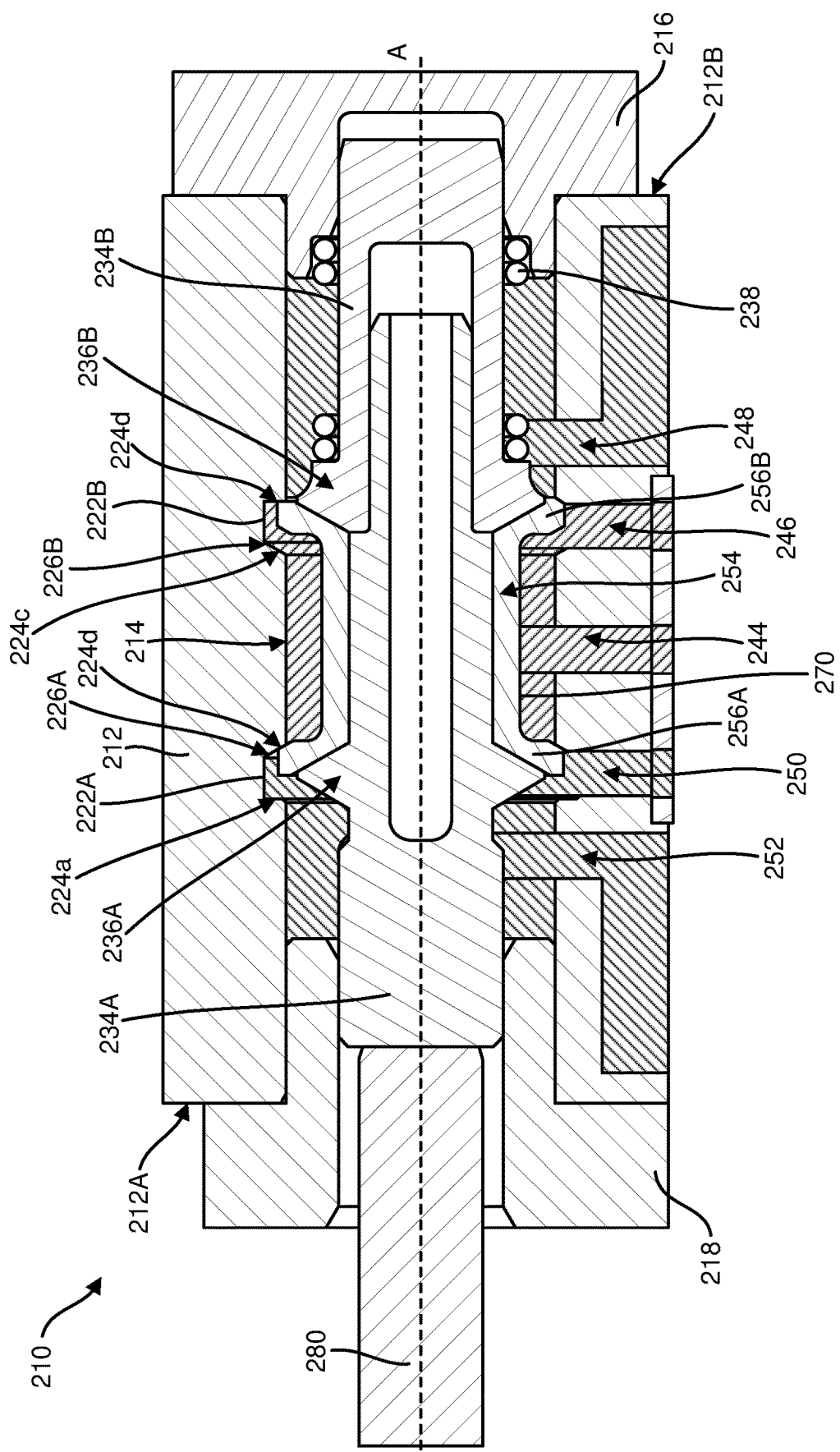
Figure 11A:
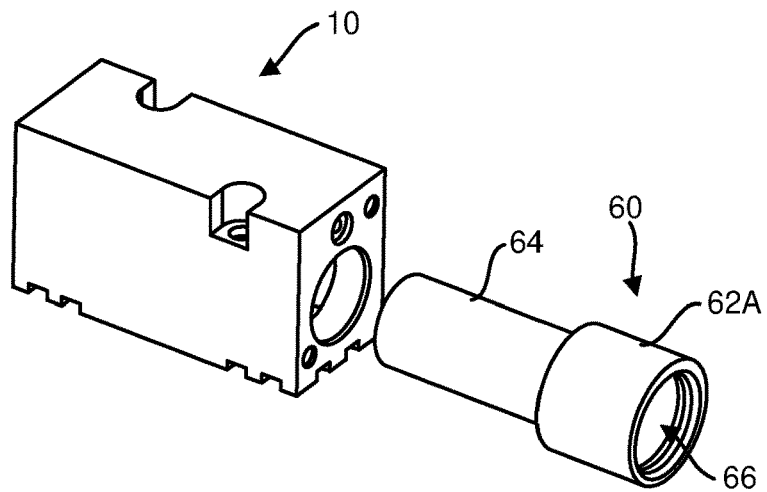
Figure 11B:
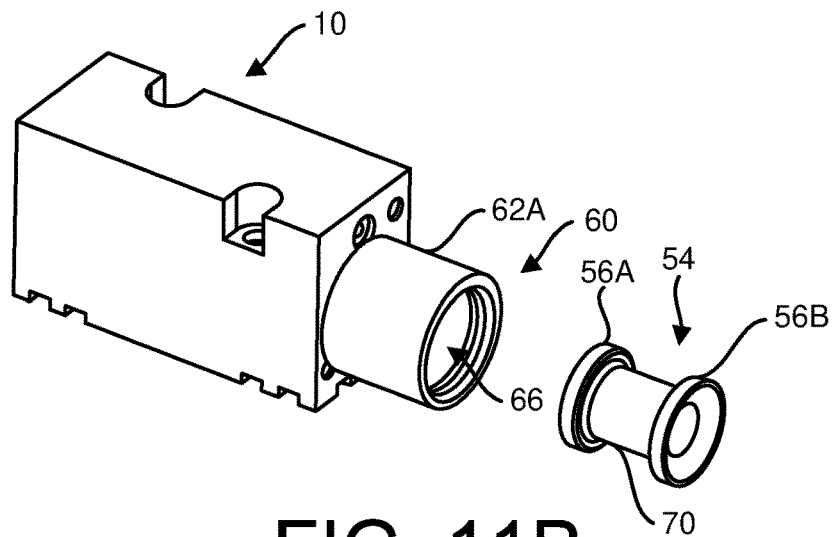
Figure 11C:
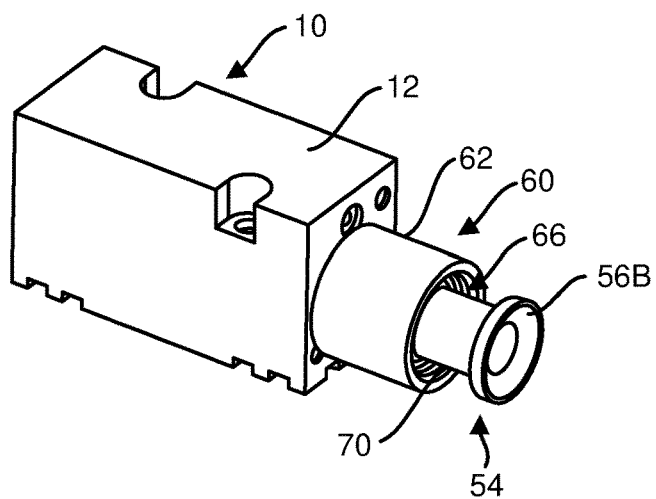
Figure 12A:
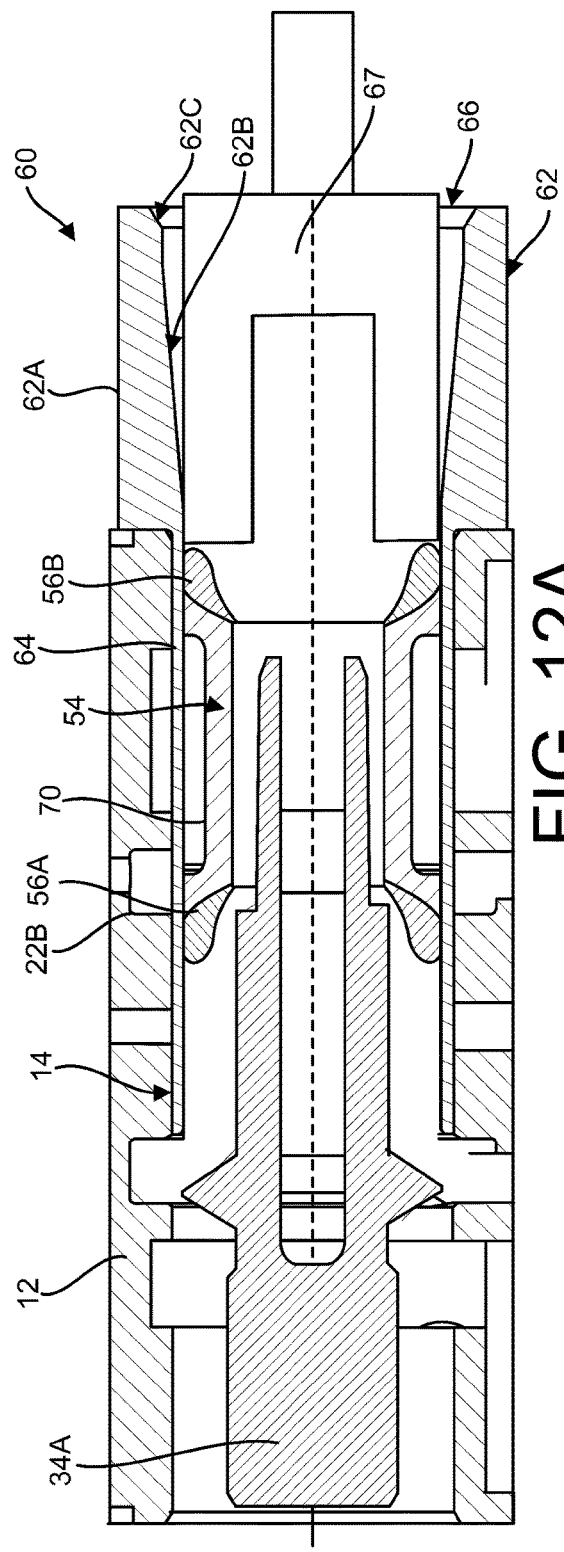
Figure 12B:
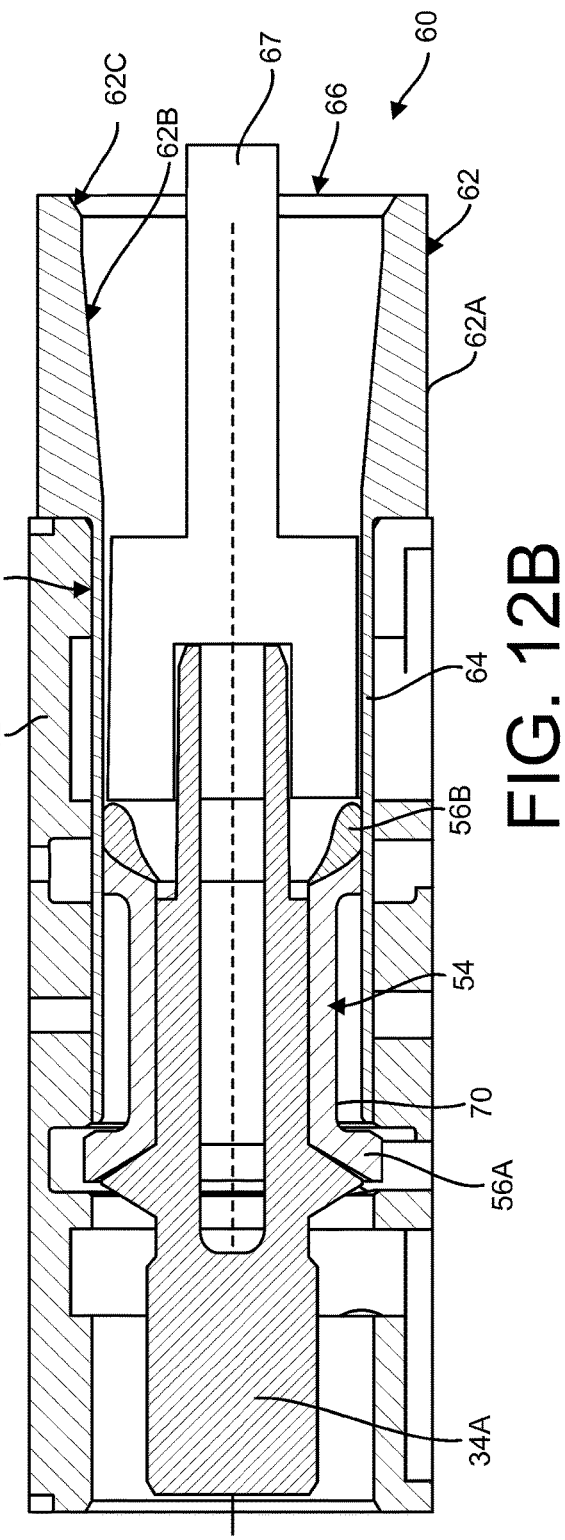

FIG. 1 is an isometric view of the valve assembly of the first embodiment of the invention FIG. 2 is a section view of the valve assembly of FIG. 1 in a closed position FIG. 3 is a close up view of detail A-A FIG. 4 is a section view of the valve assembly of FIG. 2 in an open position FIG. 5 is a close up view of detail B-B FIG. 6 is a section view of the actuator of the valve assembly in accordance with the first embodiment of the invention FIG. 7 is a schematic view of a blow moulding machine FIG. 8 is a section view of a second embodiment of the invention in a closed position FIG. 9 is a section view of a second embodiment of the invention in an open position FIG. 10 is a section view of a third embodiment of the invention in an open position FIGS. 11a-c are an isometric view of the steps required to insert a seal into the valve in accordance with any of the embodiments FIG. 12a is a partial section view of the valve with a partially inserted seal FIG. 12b is a partial section view of the valve with an almost fully inserted seal

VALVE ASSEMBLY

A first embodiment of a valve assembly 10 is shown in FIG. 1. The valve assembly 10 comprises a housing 12, a first cap 16, a second cap 18, and an actuator 17.

As shown in FIGS. 2 and 4, the valve assembly 10 further comprises a spool 34, a seal 54, and a spring 38.

The housing 12 of the valve assembly 10 includes a bore 14. The bore 14 extends along the housing 12 and defines an actuation axis A. The housing 14 has two axially opposing and distal ends—a first end 12A and a second end 12B. The bore 34 also defines a space for receiving the spool 34. The bore 34 may be circular, although the cross sectional shape of the bore 34 depends on the desired shape of the spool 34 to be used in the valve assembly 10. In the first embodiment, the spool 34 is substantially cylindrical and slideably engages a substantially cylindrical interior surface of the bore 14.

In the embodiments shown in FIGS. 2 and 4, the valve assembly 10 is a 5/2 valve, however any other suitable arrangement, such as a 3/2 or a 4/2 valve, is also possible. It is known that the 5/2 valve is characterised in that it includes five ports and has two possible spool positions. The spool 34 is therefore moveable between a closed position located at the first end 12A and an open position located at the second end 12B. "Open position" and "closed position" make reference to the operating mode of the first fluid path.

As shown in FIGS. 3 and 5, the housing 12 also includes a first recess 22A and a second recess 22B. The first recess 22A extends radially away from the bore 14 and into the housing 12 and forms a groove of a predetermined axial thickness and radial depth. The first recess 22A is circumferentially disposed around the spool 34. The first recess 22A has an outer wall 24a which is aligned with a plane parallel to the first end 12A of the housing 12 and an inner wall 24b opposite to the outer wall 24a. The first recess 22A also includes a first chamfer 26A which is disposed at an intersection of an inner wall 24b of the first recess 22A and the bore 14 and which lies opposite to the outer wall 24a.

The second recess 22B is substantially a mirror image of the first recess 22A. The second recess 22B has an outer wall 24d which is aligned with a plane parallel to the second end 12B of the housing 12 and being located closer to the second end 12B that to the first end 12A. The second recess 22B also includes an inner wall 24c, located opposite the outer wall 24d. The second recess 22B also includes a second chamfer 26B which is disposed at an intersection of an inner wall 24c of the second recess 22B and the bore 14 and lies opposite to the outer wall 24d.

Referring again to FIGS. 2 and 4, the housing 12 of the valve assembly 10 has 5 primary ports—an inlet port 44, a first outlet port 50, a second outlet port 46, a first exhaust port 52, and a second exhaust port 48.

The inlet port 44 is fluidly connected to a working pressure source, so as to supply working pressure to the valve assembly 10. The first outlet port 50 and the second outlet port 46 are fluidly connectable to an external hydraulic/pneumatic device, for example to control an auxiliary valve assembly. The auxiliary valve assembly may be a valve, for example a pressure balanced valve. The valve assembly 10 can thus be used as one of the pilot valves in a complex pressure system, such as a stretch blow moulding machine.

The first exhaust port 52 and the second exhaust port 48 are connected either to the external atmosphere, or to a vacuum source, to remove pressurised fluid from the valve assembly 10. In the embodiment shown in FIGS. 2 and 4, the primary ports are arranged substantially along the actuation axis A, although any other arrangement is possible, for example each port being arranged at a different circumferential or radial position with respect to the actuation axis A. In the embodiments of FIGS. 3 and 4, the primary ports are arranged in the following order (going from the second end 12B to the first end 12A of the housing 12)—first exhaust port 52, first outlet port 50, inlet port 44, second outlet port 46, and second exhaust port 48. The person skilled in the art would appreciate that the order in which the primary ports are arranged may be modified.

The second outlet port 46 is located on a radial wall of the second recess 22B, while the first outlet port 50 is located on a radial wall of the first recess 22A.

Referring again to FIGS. 2 and 4, the housing 12 also defines secondary fluid conduits. In the first embodiment of the invention, the housing 12 includes an air spring conduit 21 and an actuator supply conduit 23A. The purpose of the air spring conduit 21 is to supply pressurised fluid from the working pressure supply to an air spring chamber 32B of the second cap 16. As shown in FIG. 6, the actuator supply conduit 23A delivers working fluid from the working pressure supply to the actuator 17.

Referring again to FIGS. 2 and 4, the second cap 16 is partially received within the bore 14 on the first end 12A of the housing 12. The first cap 18 is partially disposed within the bore 14 on the second end 12B of the housing 12, opposite the second cap 16. The second cap 16 is thus longitudinally spaced along the actuation axis A from the first cap 18.

In the first embodiment of the invention, the first cap 18 together with the housing 12 defines the actuator supply conduit 23A to supply the working pressure to the actuator 17. The first cap 18 also includes an actuator outlet conduit 23B for inducing working pressure to the bore 14 of the housing 12 in order to move the spool 34 from the closed position to the open position. The first cap 18 also includes an actuator exhaust conduit 23C for exhausting working fluid out of the actuator 17.

All pressure interfaces between the housing 12 and the first cap 18 or the second cap 16 are fluid tight thanks to o-ring or any other suitable sealing means disposed between the housing 12 and the caps.

The actuator outlet conduit 23B is in fluid communication with an actuator chamber 42 defined within the bore 14 and between the spool 34 and the first cap 18. Pressure supplied via the actuator outlet conduit 23B to the actuator chamber 42 is used to actuate the spool 34 from the closed position to the open position.

The air spring chamber 32B of the second cap 16 is in fluid communication with the air spring conduit 21, via which pressurised medium is delivered to the air spring chamber 32B. The air spring chamber 32B partially receives the spool 34. The spring chamber 32B also has a bore 32 that defines circumferential walls of the air spring chamber 32B.

Referring to FIGS. 2 and 4, the seal 54 is disposed circumferentially around the spool 34 and extends along the longitudinal axis A. The seal 54 includes a first wing 56A and a second wing 56B, spaced axially apart from the first wing 56A. The wings are interconnected by an annular central section 70 extending along the actuation axis A. The first wing 56A extends radially from the central section 70 towards and into the first recess 22A. Similarly, the second wing 56B extends radially from the central section 70 towards and into the second recess 22B. Each wing is angled away from the radial plane, towards the housing end the closest to it. Therefore, the first wing 56A is angled towards the first end 12A and the second wing 56B is angled towards the second end 12B.

As shown in FIGS. 2 and 4, the spool 34 is of a modular design and is comprised of a male module 34A and a female module 34B. The two modules may be connected together using interference fit, adhesive, or any other suitable assembly method. The male module 34A is proximal to the first end 12A whereas the female module 34B is closer to the first end 12B. Referring to FIGS. 2 and 4, the male module 34A includes a radially extending and circumferentially disposed first projection 36A for supporting the first wing 56A. The second sealing wing 56B is supported by a second projection 36B, extending radially from and disposed circumferentially around the female module 34B. Each projection is annular and substantially conical in cross-sectional view as shown in FIGS. 2 and 4, although other suitable shapes are also possible. In the first embodiment of the invention, the central section 70 of the seal 54 is disposed around the male module 34A. A skilled person would appreciate that the male module may be a female module and vice versa.

The spool 34 includes a first end seal 40A and a second end seal 40B disposed around opposing ends of the spool 34. The second end seal 40B is seated on the female module 34B of the spool 34 and is slideably in contact with the bore 14 of the housing 12. The second end seal 40B is seated on the female module 34B and is slideably in contact with the bore 32B of the air spring chamber 32. These seals can be of any type, for example a double lip seal or o-ring. Therefore, at any spool 34 position, there is no metal on metal contact between the spool 34 and the bore 14.

The valve 10 may also be part of a larger pressure system, for example a blow moulding machine 400, as shown in FIG. 7. For illustrative purposes, the valve 10 was shown in FIG. 7 in a simplified manner. In the system 400 the valve assembly 10 is used as a pilot valve. In such a machine, the valve 10 is fluidly connected to a main valve 410 comprising a housing 412 having a bore 414, a piston 416 slideably mounted within the bore 414 and moveable between an open position and a closed position. It is envisaged that the piston 416 is pressure compensated or a standard, not pressure compensated piston. The housing 412 defines a first control port in fluid communication with a first control chamber 418 and a second control port in fluid communication with a second control chamber 420. The first control chamber 418 is in fluid communication with the first outlet port 50 of the valve 10 and the second control chamber 420 is in fluid communication with the second outlet port 46 of the valve 10. The housing 412 further defines an inlet port 422 and an outlet port 424 and a flowpath between the inlet port 422 and the outlet port 424.

The outlet 424 of the main valve 410 is fluidly connected to a moulding apparatus 430. The moulding apparatus 430 includes a mould 426 and a preform 428. The moulding apparatus 430 facilitates shaping the plastic preform 428 to the shape of the mould 426 under certain conditions, one of which being application of pressure to the moulding apparatus 430. Due to being connected to the outlet 424 of the main valve 410, the moulding apparatus 430 receives pressure sufficient to mould the preform 428 when the flowpath between the inlet 422 and the outlet 424 of the main valve 410 is open. The preform 428 can be made of any material suitable for blow moulding, for example PET, although any suitable type of plastics known to the skilled person is possible.

Valve assembly 10 is a pilot valve to the main valve 410, meaning that any pressurised fluid flowing from the valve assembly 10 via the first outlet port 50 into the first control chamber 418 will result in the piston 416 moving along its actuation axis so as to close the flowpath between the inlet port 422 and the outlet port 424.

In describing alternative embodiments, similar reference numbers are used for the same components.

A second embodiment of the invention is shown in FIGS. 8 and 9. The second embodiment of the valve assembly 110 is substantially the same as the first embodiment of the valve assembly 10, except no air spring or radial seal at the second end 112B are included. Such a valve assembly 110 is controlled by the pressure from the actuator supplied via the actuator outlet conduit 123B into the actuator chamber 142.

A third embodiment if the invention is shown in FIG. 10. The third embodiment is substantially the same as the second embodiment shown in FIGS. 8 and 9. The valve assembly 210 of the third embodiment differs in that the actuation method is purely mechanical. A plunger 280 is operatively connected to the spool 234 at the first end 212A of the housing 212. The plunger 280 is colinear with the spool 234. Actuation of the valve assembly 210 is therefore facilitated by pushing the plunger into the spool 234.

It is envisaged that any of the embodiments described above could form part of the blow moulding system 400 and serve as pilot valves connected to the main valve 410.

Assembly of the Seal

Referring to FIGS. 11a to 11c, the seal 54 is of a unitary construction, meaning that assembling the seal 54 requires additional tooling, so as to place the seal 54 in position within the housing 12 without the risk of damaging the seal. Advantageously, the seal 54 can be inserted into the housing 12 by means of an inserting means 60. The inserting means 60 comprises an exterior section 62 including an outside insert surface 62A and an inside insert surface 62B, and a bore section 64. The exterior section 62 defines an opening 66 through which the seal 54 can be inserted into the inserting means 60. The exterior section 62 also includes an outer surface 62A and an inner surface 62B, both of which are circumferentially disposed around a longitudinal axis of the inserting means 60. The interior section 64 extends longitudinally from the exterior section and has a diameter which is smaller than the diameter of the bore 12, to the extent that the interior section 64 can be inserted into the bore 12. The interior section 64 is, in fact, the only part of the inserting means 60 which may enter the bore 12. The exterior section 62 abuts an outside surface of the housing 12 such that the exterior section 62 does not enter the bore 14 when the insert 60 is inside the housing 12. The exterior section 62 also defines a chamfered lip 62C and the inside surface 62B is tapered.

In use, as shown in FIG. 11c, the seal 54 is inserted into the inserting means 60 through the opening 66. To insert the seal 54 fully into the bore section 64, the seal 54 must first be forced through the exterior section 62 with help of a lubricant. Referring now to FIGS. 12a and 12b, firstly, the first module 34A of the spool 34 is inserted into the bore 14 of the housing 12. The exterior section 62 fits around the first module 34A of the spool 34. Forcing the seal 54 through the inserting means 60 is achieved by installation means 67 which installation means 67 enables to force the seal 54 across the inserting means 60 so as to locate the seal 54 within the recesses of the valve assembly 10. The lip 66C and the inside surface 62B help to gradually compress the seal 54 before it enters the bore section 64. Seal 54 with compressed first seal wing 56A and compressed second seal wing 56B is then forced along the inserting means 60 by installation means 67, onto the first module 34A of the spool 34. The exterior section 62 acts as a positive stop and the length of the bore section 64 is such that, when fully within the bore 14, the inserting means 60 terminates before the inside wall 24b of the first recess 22A. The inserting means 60 is then removed from the bore, all the while holding the seal 54 in place by means of the installation means 67, in order to enable seal wings to expand. Firstly, the first seal wing 56A expands into the first recess 22A and then the second seal wing 56B expands into the second recess 22B. Once the inserting means 60 is fully removed, the seal 54 expands into its design shape. Once the seal 54 expands into its design shape, the second module 34B is inserted, so as to axially constrain the seal 54. After that, caps can be attached to each ends of the housing 12, so as to create a fluid tight environment within the valve assembly 10. Advantageously, the seal 54 can be inserted into the bore 14 which has multiple sharp edges without compromising its structural integrity or surface quality.

Operating Principles

Sealing Element

I. Closed Position

In use, the spool 34 is moveable between a closed position and an open position. In the closed position, the male module 34A of the spool 34 is at its top dead centre in the proximity of the first end 12A. This arrangement is illustrated in FIG. 2. The closed position in the sense of this embodiment means that pressurised fluid enters the system via the inlet port 44, the first outlet port 50 is pressurised, the actuator supply conduit 23A is pressurised, and the actuator 17 is switched off. Thus, there is a flow path established between the first outlet port 50 and the inlet port 44, with all other primary ports not being fluidly connected to the working pressure source.

In such conditions, as shown in FIG. 3, the second wing 56B abuts against the inner wall 24c of the second annular recess 22B, while the first wing 56A bears against the outer wall 24a of the first annular recess 22A. More specifically, the second wing 56B abuts the chamfered edge 26B of the second recess 22B such that the second wing 56B is sheared between the second projection 36B and the chamfered edge 26B. The first wing 56A is lifted off the first projection 36A, meaning that the relative angle between the body of the first wing 56A and a radial plane is smaller than in a neutral position, whereby the second wing 56B rests on the second projection 36B. The deflection of the first wing 56A is balanced by the net force applied to the first wing 56A by the working pressure from the inlet port 44. Therefore, the seal 54 separates areas of high and low pressure from each other, wherein high pressure fluid always acts on the surface of the seal 54 angled towards the inside surface of the bore 14.

In the closed position, the seal 54 prevents pressurised fluid from entering the second outlet port 46, the first exhaust port 52, the second exhaust port 48, or the air spring conduit 21. Therefore, the first seal wing 56A and the second wing 56B work together to maintain a flow path between the inlet port 44 and the first outlet port 50. In the closed position, the spring 38 is decompressed and the air spring chamber 32 contains fluid at low pressure or vacuum. Therefore, the valve assembly 10 will remain in this position, unless the actuator 17 actuates the spool 34.

In relation to the blow moulding system 400 of FIG. 7, when the valve assembly 10 is in the closed position, working fluid is expelled from the valve assembly 10 via the first outlet port 50 into the first control chamber 418 of the main valve 410. At the same time, there is no working pressure in the second outlet port 46 which is connected to the second control chamber 420. The net force on the piston 416 is such that the flowpath between the inlet port 422 and the outlet 424 is closed by the piston 416. In this position, no pressurised fluid is induced into the moulding apparatus 430. Therefore, no blow moulding is actively taking place. This moment of inactivity may be used to prepare the moulding apparatus 430 for moulding a bottle, for example by inserting a preform 428 into the mould 426 and establishing a fluid communication channel between the blow moulding apparatus 430 and the main valve 410.

As regarding the second embodiment of the invention shown in FIGS. 8 and 9, maintaining the valve assembly 110 in the closed position is achieved using similar means as those described above in relation to the first embodiment of the valve assembly 10. The seal 154 abuts walls of relevant recesses 122A and 122B at the same locations and in a similar fashion to the first embodiment. The main difference being that the second embodiment has no air spring channel, so no vacuum or low pressure is maintained in such a channel. This valve assembly 110 may also achieve closing of the flowpath of the main vale 410, thus preventing any fluid from entering the blow moulding apparatus 430.

Regarding the third embodiment of the invention shown in FIG. 10, the seal 254 of the valve assembly 210 operates in a similar way to that described in relation to the first and second embodiment. The difference between the valve assembly 210 and the valve assembly 10 is that channels for delivering working fluid to the air spring or to and from the actuator are not present in the valve assembly 210. Actuation is purely mechanical, achieved by means of the plunger 280. In the closed position, the plunger 280 does not apply any axial forces onto the spool 234, thus enabling a flowpath between the inlet port 244 and the first outlet port 250, with the first exhaust port 252, the second outlet port 246 and the second exhaust port 248 not fluidly connected to a pressure supply.

II. Open Position

In the first embodiment, the female module 34B of the spool 34 is at its top dead centre in the proximity of the first end 12B when the spool is in the open position. This arrangement is illustrated in FIG. 4. The open position means that the pressurised working fluid enters the system via the inlet port 44 and there is an open flowpath between the inlet port 44 and the second outlet port 46. In such a case, the actuator 17 is switched on, meaning it opens a flowpath going from the inlet port 44, via the actuator supply conduit 23A onto the actuator outlet conduit 23B and into the actuator chamber 42. Therefore, the actuator 17 overcomes the biasing force of the biasing force of the spring 38, moving the spool 34 and compressing the spring 38.

In such conditions, as shown in FIG. 5 the first wing 56A abuts against the inner wall 24b of the first annular recess 22A, while the second wing 56B bears against the outer wall 24d of the second annular recess 22B. More specifically, the first wing 56A abuts the chamfered edge 26A of the first recess 22A such that the first wing 56A is sheared between the first projection 36A and the chamfered edge 26A. The second wing 56B is lifted off the second projection 36B, meaning that the relative angle between the body of the second wing 56B and a radial plane is smaller than in a neutral position, whereby the second wing 56B rests on the radial projection 36B. The deflection of the second wing 56B is balanced by the net force applied to the second wing 56B by the working pressure from the inlet port 44. Therefore, the seal 54 separates areas of high and low pressure from each other, wherein high pressure fluid always acts on the surface of the seal 54 angled towards the inside surface of the bore 14.

In the open position, the seal 54 prevents pressurised fluid from entering the first outlet port 50, the first exhaust port 52, or the second exhaust port 48. Therefore, the first wing 56A and the second wing 56B work together to maintain an open flow path between the inlet port 44 and the second outlet port 46, and between the inlet port 44 and the actuator chamber 42. In the open position, the spring 38 is compressed and the air spring chamber 32 contains fluid at high pressure.

In the open position, the spring 38 is fully compressed and the air spring chamber 32 contains pressurised fluid. Therefore, the net force acting on the spool 34 is such that the force due to spring 38 compression and fluid contained in the air spring chamber 32 acting on the spool 34 is larger than the force due to the fluid contained within the actuation chamber 42 acting on the spool 34. The net force pushes the spool 34 to close the valve assembly 10. Providing a combination of the spring 38 and the air spring to close the valve assembly 10 results in much faster switching times in comparison to any known devices of this type.

In relation to the blow moulding system 400 of FIG. 7, when the valve assembly 10 is in the open position, working fluid flows from the valve assembly 10 via the second outlet port 46 into the second control chamber 420 of the main valve 410. At the same time, there is no working pressure in the first outlet port 50, which is connected to the second control chamber 420. The net force on the piston 416 is such that the flowpath between the inlet port 422 and the second outlet 424 is opened by the piston 416. In this position, pressurised fluid is induced into the moulding apparatus 430 and blow moulding can take place. The preform 428 is moulded to the shape of the mould 426 in order to manufacture a container, for example a plastic bottle or similar. The main valve 410 will enable pressurised fluid to charge into the preform for as long as the main valve 410 is open, which in turn means that as long as the valve assembly 10 is in the open position, the preform 428 will remain pressurised. In order to provide appropriate conditions for manufacturing items out of preforms, the main valve 410 must be shut after a period of time. The valve assembly 10 controls the length of time during which the main valve 410 is open.

As regarding the second embodiment of the invention shown in FIGS. 8 and 9, maintaining the valve assembly 110 in the open position is achieved using similar means as those described above in relation to the first embodiment of the valve assembly 10. The seal 154 abuts walls of relevant recesses 122A and 122B at the same locations and in a similar fashion to the first embodiment. The main difference being that the second embodiment has no air spring channel, so no vacuum or low pressure is maintained in such a channel. In order to return the spool 134 to the closed position, the pressure within the pilot chamber 142 acting on the spool 134 is counteracted by the spring force of the spring 138. For the valve assembly 110 to shut correctly, the spring 138 must provide a much larger axial force than the actuator 17 connected to the pilot chamber 142. This valve assembly 110 also achieve opening of the flowpath of the main valve 410, thus enabling fluid to enter the blow moulding apparatus 430 so as to shape the preform 428.

Regarding the third embodiment of the invention shown in FIG. 10, the seal 254 of the valve assembly 210 operates in a similar way to that described in relation to the first and second embodiment. The difference between the valve assembly 210 and the valve assembly 10 is that channels for delivering working fluid to the air spring or to and from the actuator are not present in the valve assembly 210. Actuation is purely mechanical, achieved by means of the plunger 280. In the open position, the plunger 280 applies an axial force onto the spool 234, thus opening a flowpath between the inlet port 244 and the first outlet port 250, with the first exhaust port 252, the second outlet port 246 and the second exhaust port 248 not fluidly connected to a pressure supply.

Clauses

1. A valve (10) comprising a bore (14) extending about an actuation axis (A), an inlet port (44), a first outlet port (50), and a first exhaust port (52) wherein a spool (34) inside the bore (14) is actuated between a first working position and a second working position, and a first seal wing (56A) arranged on the spool (34),
   wherein a diameter of the spool (34) is smaller than a diameter of the bore (14) thus establishing a first fluid path between the inlet port (44) and the first outlet port (50) and establishing a second fluid path between the first outlet port (50) and the first exhaust port (52);
   a first annular recess (22A) radially extending from the bore (14) and being in permanent fluid connection with the first outlet port (50), the first recess (22A) comprising an outer first recess wall (24a) next to the first exhaust port (52) and an inner first recess wall (24b) next to the inlet port (44);
   whereby the first seal wing (56A) is arranged on the spool (34), such that:
      in the first working position, the first seal wing (56A) abuts to the outer first recess wall (24a), thus closing the second flow path and opening the first flow path;
      in the second working position, the first seal wing (56A) abuts to the inner first recess wall (24b), thus closing the first flow path and opening the second flow path.

2. The valve (10) of the preceding claim further comprising a second outlet port (46), a second exhaust port (48), and a second seal wing (56B),
   wherein a third flow path is established between the inlet port (44) and the second outlet port (46) and a fourth flow path is established between the second outlet port (46) and the second exhaust port (48);
   a second annular recess (22B) radially extending from the bore (14) and being in permanent fluid communication with the second outlet port (46), the second annular recess (22B) comprising an outer second recess wall (24d) next to the second exhaust port (48) and an inner second recess wall (24c) next to the inlet port (44).
   whereby the second seal wing (56B) is arranged on the spool (34), such that:
      in the first working position, the second seal wing (56B) abuts to the second inner recess wall (24c), thus closing the fourth flow path and opening the third flow path;
      in the second working position, the second seal wing (56B) abuts to the outer second recess wall (24d), thus closing the third flow path and opening the fourth flow path.

3. The valve (10) of any preceding claim wherein the valve (10) includes a housing (12), a first pressure cap (18), and a second pressure cap (16), the housing (12) having the bore (14), and having a first housing end (12A) and a second housing end (12B), wherein the first pressure cap (18) is disposed at the first end (12A) of the housing (12), and the second pressure cap (16) disposed at the second end (12B) of the housing (12).

4. The valve (10) of claim 3 further comprising a biasing element (38) for returning the valve (10) from the second working position to the first working position and disposed around the spool (34) and between the spool (34) and the second pressure cap (16).

5. The valve (10) of any preceding claim wherein the first seal wing (56A) is flexible, such that, in the first working position of the valve (10), it is adapted to abut the first outer recess wall (24a) so as to elastically deflect.

6. The valve (10) of any of the claims 2 to 4, wherein the second seal wing (56B) is flexible, such that, in the second working position of the valve (10), it is adapted to abut the second outer recess wall (24d) so as to elastically deflect.

7. The valve (10) of any of the claims 2 to 6 comprising a tubular connector (70) disposed around the spool (34) and extending axially between the first (56A) and second (56B) seal wing, wherein the first seal wing (56A), the second seal wing (56B), and the tubular connector (70) together form a unitary seal (54).

8. The valve (10) of any preceding claim further comprising a first dynamic seal (40A) and a second dynamic seal (40B), said first (40A) and second (40B) dynamic seal being circumferentially disposed around each end of the spool (34), the dynamic seals (40A, 40B) being configured to centre the spool (34) such that the spool (34) does not directly contact the bore (14) of the housing (12).

9. The valve (10) of claim 3, wherein the second pressure cap (18) comprises a secondary bore (32B) for receiving the spool (34), wherein the secondary bore (32B) is permanently fluidly connected to the second annular recess (22B), such that the secondary bore (32B) is configured to act as an air spring for transmitting the spool (34) from the second working position to the first working position.

10. The valve (10) of claims 8 and 9, wherein the first dynamic seal (40A) is arranged between the bore (14) and the spool (34) and the second dynamic seal (40B) is arranged between the spool (34) and the secondary bore (23B).

11. The valve (10) of any preceding claim further comprising a first chamfered edge (26A) disposed at an intersection between the bore (14) and the inner first recess wall (24b).

12. The valve (10) of any of the claims 2 to 4 and 6 to 10, further comprising a second chamfered edge (26B) disposed at an intersection between the bore (14) and the inner second recess wall (24c).

13. The valve (10) of any preceding claim, wherein the spool (34) includes a first radially extending protrusion (36A) for accommodating the first seal wing (56A).

14. The valve (10) of any of the claims 2 to 4, 6 to 10, and 12, wherein the spool includes a second radially extending protrusion (36B) for accommodating the second seal wing (56B).

15. The valve (10) of any preceding claim wherein the first seal wing (56A) has a diameter which is smaller than a diameter of the first recess (22A).

16. The valve (10) of any of the claims 2 to 4, 6 to 10, 12 and 14, wherein the second seal wing (56B) has a diameter which is smaller than a diameter of the second recess (22B).

17. The valve (10) of claim 11, wherein, in the second working position, the first sealing wing (56A) is sheared between the first chamfered edge (26A) of the first recess (22A) and the first protrusion (36A) so as to establish a fluid tight contact patch therebetween, while the second seal wing (56A) bears against the outer second recess wall (24d), so as to deflect from the second protrusion (36B), forming a gap therebetween.

18. The valve (10) of claim 12, wherein, in the first working position, the second sealing wing (56B) is sheared between the second chamfered edge (26B) of the second recess (22B) and the second protrusion (36A) so as to establish a fluid tight contact patch therebetween, while the first seal wing (56B) bears against the outer first recess wall (24d), so as to deflect from the first protrusion, forming a gap therebetween.

19. The valve (10) of any preceding claim further comprising an actuator operatively connected to the spool (34) for moving the spool (34) from the first working position to the second working position, where the actuator is: electromechanical, hydraulic, or pneumatic.

20. The valve (10) of claims 3 and 19, wherein the actuator is disposed on or within the first pressure cap (18).

21. The valve (10) of any preceding claim, wherein the spool (34) comprises of a first module (34A) and a second module (34B), wherein the second module (34B) receives the first module (34A) thus forming an interference fit therebetween.

22. The valve (10) of claim 13 or 14, and 21, wherein the first module (34A) includes the first radially extending protrusion (36A), and wherein the second module (34B) includes the second radially extending protrusion (36B).

23. The valve (10) of claim 22, wherein the biasing element (38) is clamped between the second protrusion (36B) and the second pressure cap (16).

24. The valve (10) of any preceding claim, wherein the first exhaust port (52) is disposed on an inside surface of the bore (14) and is permanently fluidly connected to the second fluid port (46), or wherein the second exhaust port (48) is disposed on an inside surface of the bore (14) and is permanently fluidly connected to the first fluid port (50).

25. A blow moulding machine (400), comprising:
a main valve (410) comprising a housing (412) and a piston (416) moveable within a bore (414) of the housing (412), the housing (412) having at least one inlet port (422) and at least one outlet port (424) in fluid communication with the inlet port (422), the housing (412) also comprising a first control port and a second control port, the first control port being in fluid communication with a first control chamber (418) and the second fluid port being in fluid communication with the second control chamber (420),
a valve (10) as defined in of any of the preceding claims, wherein the first outlet port (50) is in fluid communication with the first control chamber (418), and the second outlet port (46) is in fluid communication with the second control chamber (420), such that when the valve (10) is in the open position, the piston (416) opens a flow path between the inlet port (422) and the outlet port (424), and when the valve (10) is in the closed position, the piston (416) closes the flow path between the inlet port (422) and the outlet port (424).

26. The blow moulding machine of any preceding claim, wherein the main valve is pressure balanced.

27. The blow moulding machine of any preceding claim, wherein the blow moulding valve is for manufacturing plastic containers or plastic bottles.

28. A seal (54), comprising:
a tubular section (70) extending along an axis (A) and having a first and a second end;
a first wing section (56A) disposed at the first end of the tubular section (70), the first wing section (56B) extending radially away from the first end of the tubular section (70);
a second wing section (56B) disposed at the second end of the tubular section (70), the second wing section (56B) extending radially away from the second end of the tubular section (70);
wherein the first wing section (56A) and the second wing section (56B) extend axially along the axis away from one another,
wherein the tubular section (70), the first wing section (56A), and the second wing section (56B) together define a unitary seal for a spool valve.

29. A method of assembling a valve of any preceding claim, comprising the steps of:
providing: a housing (12) having a bore (14) extending along an axis (A), and having a first end (12A) and a second end (12B); a modular piston (34) having a first module (34A) and a second module (34B), wherein the first module (34A) is received in an opening of the second module (34B), the first module (34A) having a first radial protrusion (36A) and the second module (34B) having a second protrusion (36B); a unitary seal (54) having a tubular (70) section with a first and a second end; a biasing spring (38); and a cap (16)
providing a tubular insert (60) for introducing the unitary seal (54) into the bore (14) of the housing (12), the tubular insert (60) having a bore section (64) for engaging the bore (12) and an exterior section (62) for compressing the seal (54);
inserting the first module of the piston into the housing;
forcing the unitary seal (54) through the exterior section (62) so as to compress the seal (54) and so as to insert the compressed seal (54) into the bore section (64);
removing the tubular insert (60) from the bore (14) to allow the seal (54) to expand into the recesses of the housing (12) and to mount the unitary seal (54) on the first module (34A) of the piston (34) so that the seal (54) is in contact with the first radial protrusion (36A);
assembling the second module (34B) onto the first module (34A) so that the seal (54) is also in contact with the second radial protrusion (36B);
disposing the biasing spring (38) on the second radial protrusion (36B);
attaching the cap (16) to the second housing end (12B), such that the spring (38) is clamped between the second protrusion (36B) and the cap (16).

The invention claimed is:

1. A valve comprising a bore extending about an actuation axis, an inlet port, a first outlet port, a first exhaust port, a second outlet port, and a second exhaust port, wherein a spool inside the bore is actuated between a first working position and a second working position, and a first circumferential seal wing and a second circumferential seal wing being arranged on the spool,
wherein a diameter of the spool is smaller than a diameter of the bore thus establishing a first flow path between the inlet port and the first outlet port, establishing a second flow path between the first outlet port and the first exhaust port, establishing a third flow path between the inlet port and the second outlet port, and establishing a fourth flow path between the second outlet port and the second exhaust port; and
a first annular recess radially extending from the bore and being in permanent fluid communication with the first outlet port, the first annular recess comprising an outer first recess wall next to the first exhaust port and an inner first recess wall next to the inlet port;
a second annular recess radially extending from the bore and being in permanent fluid communication with the second outlet port, the second annular recess comprising an outer second recess wall next to the second exhaust port and an inner second recess wall next to the inlet port, whereby the first circumferential seal wing and the second circumferential seal wing are arranged on the spool, such that:

in the first working position, the first circumferential seal wing abuts to the outer first recess wall, thus closing the second flow path and opening the first flow path, and the second circumferential seal wing abuts to the inner second recess wall, thus closing the third flow path and opening the fourth flow path, and in the second working position, the first circumferential seal wing abuts to the inner first recess wall, thus closing the first flow path and opening the second flow path, and the second circumferential seal wing abuts to the outer second recess wall, thus closing the fourth flow path and opening the third flow path, wherein the first circumferential seal wing is flexible, such that, in the first working position of the valve, the first circumferential seal wing is adapted to abut the first outer recess wall so as to elastically deflect, and wherein the second circumferential seal wing is flexible, such that, in the second working position of the valve, the second circumferential seal wing is adapted to abut the second outer recess wall so as to elastically deflect.

2. The valve of claim 1, wherein the valve includes a housing, a first pressure cap, and a second pressure cap, the housing having the bore, and having a first end and a second end, wherein the first pressure cap is disposed at the first end of the housing, and the second pressure cap disposed at the second end of the housing, the valve further comprising a biasing element for returning the valve from the second working position to the first working position and disposed around the spool and between the spool and the second pressure cap.

3. The valve of claim 1, further comprising a tubular connector disposed around the spool and extending axially between the first and second circumferential seal wing, wherein the first circumferential seal wing, the second circumferential seal wing, and the tubular connector together form a unitary seal.

4. The valve of claim 1, further comprising a first dynamic seal and a second dynamic seal, said first and second dynamic seal being circumferentially disposed around each end of the spool, the first dynamic seal and the second dynamic seal being configured to centre the spool such that the spool does not directly contact the bore.

5. The valve of claim 4, wherein the valve includes a housing, a first pressure cap, and a second pressure cap, the housing having the bore, and having a first end and a second end, wherein the first pressure cap is disposed at the first end of the housing, and the second pressure cap disposed at the second end of the housing, wherein the second pressure cap comprises a secondary bore for receiving the spool, wherein the secondary bore is permanently fluidly connected to the second annular recess, such that the secondary bore is configured to act as an air spring for transmitting the spool from the second working position to the first working position, wherein the first dynamic seal is arranged between the bore and the spool and the second dynamic seal is arranged between the spool and the secondary bore.

6. The valve of claim 1, further comprising a first chamfered edge disposed at an intersection between the bore and the inner first recess wall, and comprising a second chamfered edge disposed at an intersection between the bore and the inner second recess wall.

7. The valve of claim 1, wherein the spool includes a first radially extending protrusion for accommodating the first circumferential seal wing, and wherein the spool includes a second radially extending protrusion for accommodating the second circumferential seal wing.

8. The valve of claim 7, wherein the first circumferential seal wing has a diameter which is smaller than a diameter of the first annular recess, and wherein the second circumferential seal wing has a diameter which is smaller than a diameter of the second annular recess.

9. The valve of claim 1, further comprising a first chamfered edge disposed at an intersection between the bore and the inner first recess wall, and comprising a second chamfered edge disposed at an intersection between the bore and the inner second recess wall, wherein the spool includes a first radially extending protrusion for accommodating the first circumferential seal wing, and wherein the spool includes a second radially extending protrusion for accommodating the second circumferential seal wing, wherein, in the second working position, the first circumferential seal wing is sheared between the first chamfered edge of the first annular recess and the first radially extending protrusion so as to establish a fluid tight contact patch therebetween, while the second circumferential seal wing bears against the outer second recess wall, so as to deflect from the second radially extending protrusion, forming a gap therebetween, and wherein, in the first working position, the second circumferential seal wing is sheared between the second chamfered edge of the second annular recess and the second radially extending protrusion so as to establish a fluid tight contact patch therebetween, while the first circumferential seal wing bears against the outer first recess wall, so as to deflect from the first radially extending protrusion, forming a gap therebetween.

10. The valve of claim 1, further comprising an actuator operatively connected to the spool for moving the spool from the first working position to the second working position, where the actuator is: electromechanical, hydraulic, or pneumatic, wherein the valve includes a housing, a first pressure cap, and a second pressure cap, the housing having the bore, and having a first end and a second end, wherein the first pressure cap is disposed at the first end of the housing, and the second pressure cap disposed at the second end of the housing, wherein the actuator is disposed on or within the first pressure cap.

11. The valve of claim 1, wherein the valve includes a housing, a first pressure cap, and a second pressure cap, the housing having the bore, and having a first end and a second end, wherein the first pressure cap is disposed at the first end of the housing, and the second pressure cap disposed at the second end of the housing, the valve further comprising a biasing element for returning the valve from the second working position to the first working position and disposed around the spool and between the spool and the second pressure cap, wherein the spool includes a first radially extending protrusion for accommodating the first circumferential seal wing, and wherein the spool includes a second radially extending protrusion for accommodating the second circumferential seal wing, wherein the spool comprises of a first module and a second module, wherein the second module receives the first module thus forming an interference fit therebetween, and wherein the first module includes the first radially extending protrusion, and wherein the second module includes the second radially extending protrusion, and wherein the biasing element is clamped between the second radially extending protrusion and the second pressure cap.

12. A blow moulding machine, comprising:
a main valve comprising a housing and a piston moveable within a bore of the housing, the housing having at least one inlet port and at least one outlet port in fluid communication with the inlet port, the housing also comprising a first control port and a second control port, the first control port being in fluid communication with a first control chamber and the second control port being in fluid communication with a second control chamber,
the valve of claim 1, wherein the first outlet port is in fluid communication with the first control chamber, and the second outlet port is in fluid communication with the second control chamber, such that when the valve is in an open position, the piston opens a flow path between the inlet port and the outlet port, and when the valve is in a closed position, the piston closes the flow path between the inlet port and the outlet port.

13. The blow moulding machine of claim 12, wherein the main valve is pressure balanced, or wherein the main valve is for manufacturing plastic containers, or plastic bottles.

14. A seal, comprising:
a tubular section extending along an axis and having a first and a second end;
a first wing section disposed at the first end of the tubular section, the first wing section extending radially away from the first end of the tubular section; and
a second wing section disposed at the second end of the tubular section, the second wing section extending radially away from the second end of the tubular section,
wherein the first wing section and the second wing section extend axially along the axis away from one another, and
wherein the tubular section, the first wing section, and the second wing section together define a unitary seal for a spool valve.

15. A method of assembling a valve, the method comprising the steps of:
providing: a housing having a bore extending along an axis, and having a first end and a second end; a piston having a first module and a second module, wherein the first module is received in an opening of the second module, the first module having a first radial protrusion and the second module having a second radial protrusion; a unitary seal having a tubular section with a first and a second end; a biasing spring; and a cap;
providing a tubular insert for introducing the unitary seal into the bore of the housing, the tubular insert having a bore section for engaging the bore and an exterior section for compressing the unitary seal;
inserting the first module of the piston into the housing;
forcing the unitary seal through the exterior section so as to compress the unitary seal and so as to insert the unitary seal into the bore section;
removing the tubular insert from the bore to allow the unitary seal to expand into recesses of the housing and to mount the unitary seal on the first module of the piston so that the unitary seal is in contact with the first radial protrusion;
assembling the second module onto the first module so that the unitary seal is also in contact with the second radial protrusion;
disposing the biasing spring on the second radial protrusion; and
attaching the cap to the second end of the housing, such that the biasing spring is clamped between the second radial protrusion and the cap.

* * * * *